(12) United States Patent
Allen et al.

(10) Patent No.: US 7,663,621 B1
(45) Date of Patent: Feb. 16, 2010

(54) CYLINDRICAL WRAPPING USING SHADER HARDWARE

(75) Inventors: Roger L. Allen, Lake Oswego, OR (US); Harold Robert Zable, Palo Alto, CA (US); Robert Ohannessian, Jr., Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 525 days.

(21) Appl. No.: 11/556,515

(22) Filed: Nov. 3, 2006

(51) Int. Cl.
*G06T 15/00* (2006.01)
*G06T 15/50* (2006.01)
*G06T 1/00* (2006.01)
*G06F 13/14* (2006.01)
*G09G 5/00* (2006.01)

(52) U.S. Cl. .............. 345/419; 345/426; 345/501; 345/519; 345/582; 345/585

(58) Field of Classification Search .......... 345/419, 345/426, 501, 505, 519, 582, 585
See application file for complete search history.

(56) References Cited

U.S. PATENT DOCUMENTS

| | | | | |
|---|---|---|---|---|
| 5,396,583 A * | 3/1995 | Chen et al. | ............... | 345/427 |
| 5,794,016 A * | 8/1998 | Kelleher | ............... | 345/505 |
| 5,864,342 A * | 1/1999 | Kajiya et al. | ............... | 345/418 |
| 5,886,706 A * | 3/1999 | Alcorn et al. | ............... | 345/582 |
| 6,037,948 A * | 3/2000 | Liepa | ............... | 345/582 |
| 6,198,488 B1 * | 3/2001 | Lindholm et al. | ............... | 345/426 |
| 6,323,860 B1 * | 11/2001 | Zhu et al. | ............... | 345/427 |
| 6,415,050 B1 * | 7/2002 | Stegmann et al. | ............... | 382/154 |
| 6,434,277 B1 * | 8/2002 | Yamada et al. | ............... | 382/285 |
| 6,469,704 B1 * | 10/2002 | Johnson | ............... | 345/553 |
| 6,496,190 B1 * | 12/2002 | Driemeyer et al. | ............... | 345/619 |
| 6,529,206 B1 * | 3/2003 | Ohki et al. | ............... | 345/619 |
| 6,556,197 B1 * | 4/2003 | Van Hook et al. | ............... | 345/419 |
| 6,700,581 B2 * | 3/2004 | Baldwin et al. | ............... | 345/519 |
| 6,724,394 B1 * | 4/2004 | Zatz et al. | ............... | 345/581 |

(Continued)

OTHER PUBLICATIONS

Mason Woo, et al., "OpenGL Programming Guide Third Edition", Addison-Wesley, Feb. 2000, Chapter 9, 14 pages.*

(Continued)

*Primary Examiner*—Ulka Chauhan
*Assistant Examiner*—Roberta Prendergast
(74) *Attorney, Agent, or Firm*—Townsend and Townsend and Crew LLP; J. Matthew Zigmant

(57) ABSTRACT

Circuits, methods, and apparatus that perform cylindrical wrapping in software without the need for a dedicated hardware circuit. One example performs cylindrical wrapping in software running on shader hardware. In one specific example, the shader hardware is a unified shader that alternately processes geometry, vertex, and fragment information. This unified shader is formed using a number of single-instruction, multiple-data units. Another example provides a method of performing a cylindrical wrap that ensures that a correct texture portion is used for a triangle that is divided by a "seam" of the wrap. To achieve this, primitive vertices are sorted such that results are vertex order invariant. One vertex is selected as a reference. For the other vertices, a difference is found for each coordinate and a corresponding coordinate of the reference vertex. If the coordinates are near, no change is made. If the coordinates are distant, the coordinate is adjusted.

18 Claims, 8 Drawing Sheets

U.S. PATENT DOCUMENTS

| | | | |
|---|---|---|---|
| 6,788,303 B2* | 9/2004 | Baldwin | 345/522 |
| 6,791,559 B2* | 9/2004 | Baldwin | 345/557 |
| 6,897,871 B1* | 5/2005 | Morein et al. | 345/501 |
| 6,940,505 B1* | 9/2005 | Savine et al. | 345/423 |
| 6,950,107 B1* | 9/2005 | Moreton et al. | 345/543 |
| 6,975,321 B1* | 12/2005 | Lindholm et al. | 345/506 |
| 7,385,608 B1* | 6/2008 | Baldwin | 345/506 |
| 2002/0174318 A1* | 11/2002 | Stuttard et al. | 712/13 |
| 2003/0001844 A1* | 1/2003 | Driemeyer et al. | 345/426 |
| 2003/0231180 A1* | 12/2003 | Inada | 345/423 |
| 2004/0012563 A1* | 1/2004 | Papakipos et al. | 345/157 |
| 2004/0189651 A1* | 9/2004 | Zatz et al. | 345/531 |
| 2004/0207630 A1* | 10/2004 | Moreton et al. | 345/543 |
| 2005/0093872 A1* | 5/2005 | Paltashev et al. | 345/563 |
| 2005/0110792 A1* | 5/2005 | Morein et al. | 345/501 |
| 2005/0200629 A1* | 9/2005 | Morein et al. | 345/557 |

OTHER PUBLICATIONS

Mental Ray Version 3.0, Copyright 2001, 73 pages, http://www.uni-duesseldorf.de/URZ/hardware/parallel/local/xsi/XSI_html/files/mental_ray/manual/index.html.*

Kilgariff, E. and Fernando, R., "The GeForce 6 series GPU architecture", ACM SIGGRAPH 2005 Courses, Jul. 31-Aug. 4, 2005, J. Fujii, Ed. SIGGRAPH '05. ACM, New York, NY, pp. 29-49.*

Akeley, K., "Reality Engine graphics", Proceedings of the 20th Annual Conference on Computer Graphics and interactive Techniques, Aug. 2-6, 1993, SIGGRAPH '93. ACM, New York, NY, pp. 109-116.*

Lindholm, et al., Aug. 2001, "A user-programmable vertex engine", Proceedings of the 28th Annual Conference on Computer Graphics and interactive Techniques, SIGGRAPH '01. ACM, New York, NY, pp. 149-158.*

Molnar, et al., Jul. 1992, "PixelFlow: high-speed rendering using image composition", Proceedings of the 19th Annual Conference on Computer Graphics and interactive Techniques J. J. Thomas, Ed., SIGGRAPH '92. ACM, New York, NY, pp. 231-240.*

Montrym, et al., "InfiniteReality: a real-time graphics system", Proceedings of the 24th Annual Conference on Computer Graphics and interactive Techniques, ACM Press/Addison-Wesley Publishing Co., New York, NY, Aug. 1997, pp. 293-302.*

L.-J. Shiue, V. Goel, and J. Peters. "Mesh mutation in programmable graphics hardware", Proceedings of the ACM SIGGRAPH/EUROGRAPHICS Conference on Graphics Hardware, pp. 15-24, Jul. 2003.*

Chang-Hyo Yu; Donghyun Kim; Lee-Sup Kim, "A 33.2M vertices/sec programmable geometry engine for multimedia embedded systems," IEEE International Symposium on Circuits and Systems, 2005. ISCAS 2005, pp. 4574-4577 vol. 5, May 23-26, 2005.*

Akenine-Moller et al., Real-Time Rendering, Second Edition, A K Peters, Ltd, Natick, MA, Jul. 2002, Chapter 5.1 Generalized Texturing, pp. 120-123.*

Igehy, et al., "Parallel texture caching", Proceedings of the ACM SIGGRAPH/EUROGRAPHICS Workshop on Graphics Hardware, Aug. 8-9, 1999, HWWS '99, ACM, New York, NY, pp. 95-106.*

Baker, D. and Hoffman, N., 2006, "Game development", ACM SIGGRAPH 2006 Courses, Jul. 30-Aug. 3, 2006, SIGGRAPH '06. ACM, New York, NY, 3, pp. 1-80.*

Bleiweiss, A., 2005, "GPU shading and rendering", ACM SIGGRAPH 2005 Courses, Jul. 31-Aug. 4, 2005, SIGGRAPH '05, ACM, New York, NY, pp. 1-54.*

Blythe, D. 2006, "The Direct3D 10 system", ACM Transactions on Graphics, vol. 25, Issue 3, Jul. 2006, pp. 724-734.*

Moya, et al., "Shader Performance Analysis on a Modern GPU Architecture", Proceedings of the 38th Annual IEEE/ACM international Symposium on Microarchitecture, Nov. 12-16, 2005, IEEE Computer Society, Washington, DC, pp. 355-364.*

* cited by examiner

CYLINDRICAL WRAPPING USING SHADER HARDWARE

BACKGROUND

The present invention relates generally to graphics processing, and more particularly to using shader hardware to perform cylindrical wrapping in a graphics processor.

The demand for increased realism in computer graphics for games and other applications has been steady for some time now and shows no signs of abating. This has placed stringent performance requirements on computer system components, particularly graphics processors. For example, to generate improved images, ever increasing amounts of data and instructions need to be processed by a graphics processing unit.

Fortunately, the engineers at NVIDIA Corporation in Santa Clara, Calif. have developed a new type of processing circuit that is capable of meeting these demands. This new circuit is based on the concept of several single-instruction, multiple-data processors operating in parallel. These new processors are capable of simultaneously executing hundreds of processes.

One function that needs to be processed on a graphics processor is referred to as a "wrap" or "texture wrap." A wrap is a projection of a texture on to an object. One specific type of a wrap is a cylindrical wrap. A simple example of this is where a rectangular texture is wrapped around a cylindrical object, though other shaped textures and objects may be cylindrically wrapped.

Conventional circuits perform cylindrical wrapping using dedicated hardware, that is, circuitry implemented specifically for this purpose. However, the cylindrical wrapping function is no longer supported by current graphics standards, though an ability to perform this function is still needed for legacy purposes. Accordingly, it is undesirable to use dedicated circuitry for this function.

Thus, what is needed are circuits, methods, and apparatus for performing cylindrical wrapping in software without the need for a dedicated hardware circuit.

SUMMARY

Accordingly, embodiments of the present invention provide circuits, methods, and apparatus for performing cylindrical wrapping in software without the need for a dedicated hardware circuit. An exemplary embodiment of the present invention performs cylindrical wrapping in software running on shader hardware.

In one exemplary embodiment of the present invention, cylindrical wrapping is executed on shader hardware that alternately processes geometry, vertex, and fragment information. In this embodiment, a geometry shader program running on a unified shader hardware executes cylindrical wrapping, though other types of geometry shader hardware can be used. This unified shader is formed using a number of single-instruction, multiple-data units. Alternately, in other embodiments of the present invention, other types of processing circuits may be used.

Another exemplary embodiment of the present invention provides a method of performing a cylindrical wrap that ensures that a correct texture portion is used to shade a triangle or other primitive that is divided by a "seam" in the wrap. To achieve this, a specific embodiment of the present invention sorts the primitive vertices such that results are vertex order invariant, though other methods of making the vertices order invariant may be employed. One vertex is selected as a reference. For the other vertices, a difference is found for each coordinate and a corresponding coordinate of the reference vertex. If the coordinates are near, less than a threshold distance away, no change is made. If the coordinates are far apart, more than a threshold distance away, the coordinate is shifted.

In a specific embodiment of the present invention, if a texture coordinate is less than one-half of the texture size away from the reference vertex coordinate, the coordinate is considered near, and the coordinate is not adjusted. In this embodiment, texture size is measured in the direction of that coordinate. If the texture coordinate is more than one-half a texture away in a positive direction, the texture size in that coordinate direction is subtracted from the coordinate value. If the texture coordinate is more than one-half a texture away in a negative direction, the texture size is added to the coordinate value. In other embodiments of the present invention, other threshold values besides one-half the texture size can be used in deciding whether to adjust coordinate values.

Various embodiments of the present invention may incorporate one or more of these or the other features described herein. A better understanding of the nature and advantages of the present invention may be gained with reference to the following detailed description and the accompanying drawings.

DESCRIPTION OF EXEMPLARY EMBODIMENTS

Figure 1:
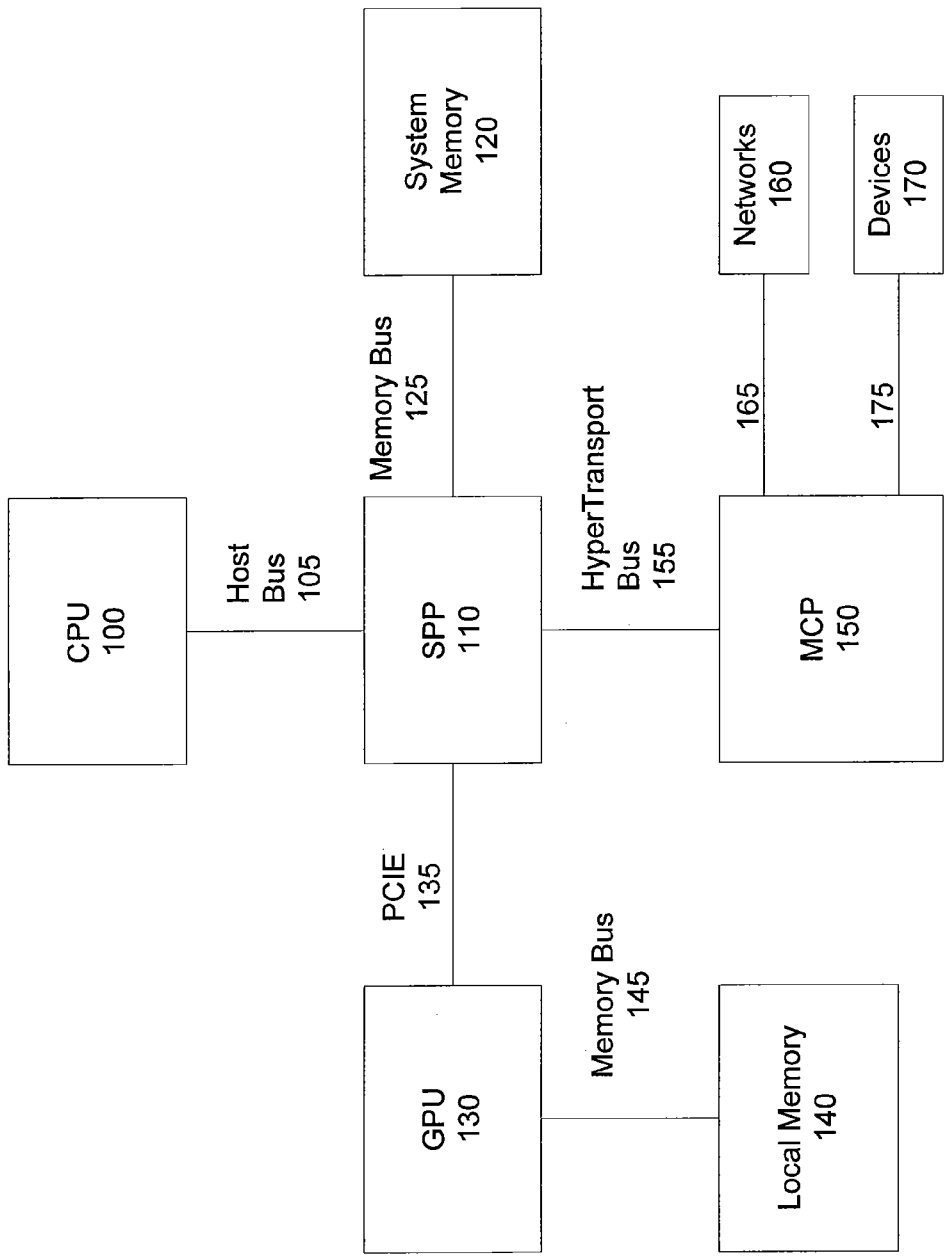
FIG. 1 is a block diagram of a computing system that is improved by incorporating an embodiment of the present invention.

FIG. 1 is a block diagram of a computing system that is improved by incorporating an embodiment of the present invention. This block diagram includes a central processing unit (CPU) or host processor 100, system platform processor (SPP) 110, system memory 120, graphics processing unit (GPU) 130, local memory 140, media communications processor (MCP) 150, networks 160, and internal and peripheral devices 170.

The CPU 100 connects to the SPP 110 over the host bus 105. The SPP 110 is in communication with the graphics processing unit 130 over a PCIE connection 135. The SPP 110 reads and writes data to and from the system memory 120 over the memory bus 125. The MCP 150 communicates with the SPP 110 via a high-speed connection, such as a Hyper-Transport bus 155, and connects network 160 and internal and peripheral devices 170 over lines 165 and 175 to the remainder of the computer system. The graphics processing unit 130 receives data over the PCIE connection 135 and generates graphic and video images for display over a monitor or other display device (not shown). The graphics processing unit 130 stores fragment and other graphics data in the local memory 140.

The CPU 100 may be a processor, such as those manufactured by Intel Corporation or other supplier, and is well-known by those skilled in the art. The SPP 110 and MCP 150 are commonly referred to as a chipset, and each is typically an integrated circuit. These may alternately be Northbridge and Southbridge devices. The system memory 120 is often a number of dynamic random access memory devices arranged in dual in-line memory modules (DIMMs). The graphics processing unit 130, SPP 110, and MCP 150 are preferably manufactured by NVIDIA Corporation.

The graphics processing unit 130 and local memory 140 may be located on a daughter board or graphics card, while the CPU 100, system platform processor 110, system memory 120, and media communications processor 150 may be located on a computer system motherboard. The graphics card is typically a printed-circuit board with the graphics processing unit 130 and local memory 140 attached. The printed-circuit board typically includes a connector, for example, a PCIE connector attached to the printed-circuit board that fits into a PCIE slot included on the motherboard.

A computer system, such as the illustrated computer system, may include more than one GPU 130. Additionally, each of these graphics processing units may be located on a separate graphics card. Two or more of these graphics cards may be joined together by a jumper or other connection. This technology, the pioneering SLI™, has been developed by NVIDIA Corporation. In other embodiments of the present invention, one or more GPUs may be located on one or more graphics cards, while one or more others are located on the motherboard.

While this embodiment provides a specific type computer system that may be improved by the incorporation of an embodiment of the present invention, other types of electronic or computer systems may also be improved. For example, video and other game systems, navigation, set-top boxes, pachinko machines, and other types of electronic systems may be improved by the incorporation of embodiments of the present invention. While embodiments of the present invention are well suited to graphics processing units, other types of graphics processors, as well as other processors, may benefit from the incorporation of an embodiment of the present invention. For example, multi or general-purpose processors, or other processors, such as integrated graphics processors or general purpose graphics processing units, may benefit from the incorporation of an embodiment of the present invention.

Also, while these types of computer systems, and the other electronic systems described herein, are presently commonplace, other types of computer and electronic systems are currently being developed, and others will be developed in the future. It is expected that many of these may also be improved by the incorporation of embodiments of the present invention. Accordingly, the specific examples listed are explanatory in nature and do not limit either the possible embodiments of the present invention or the claims.

Figure 2:
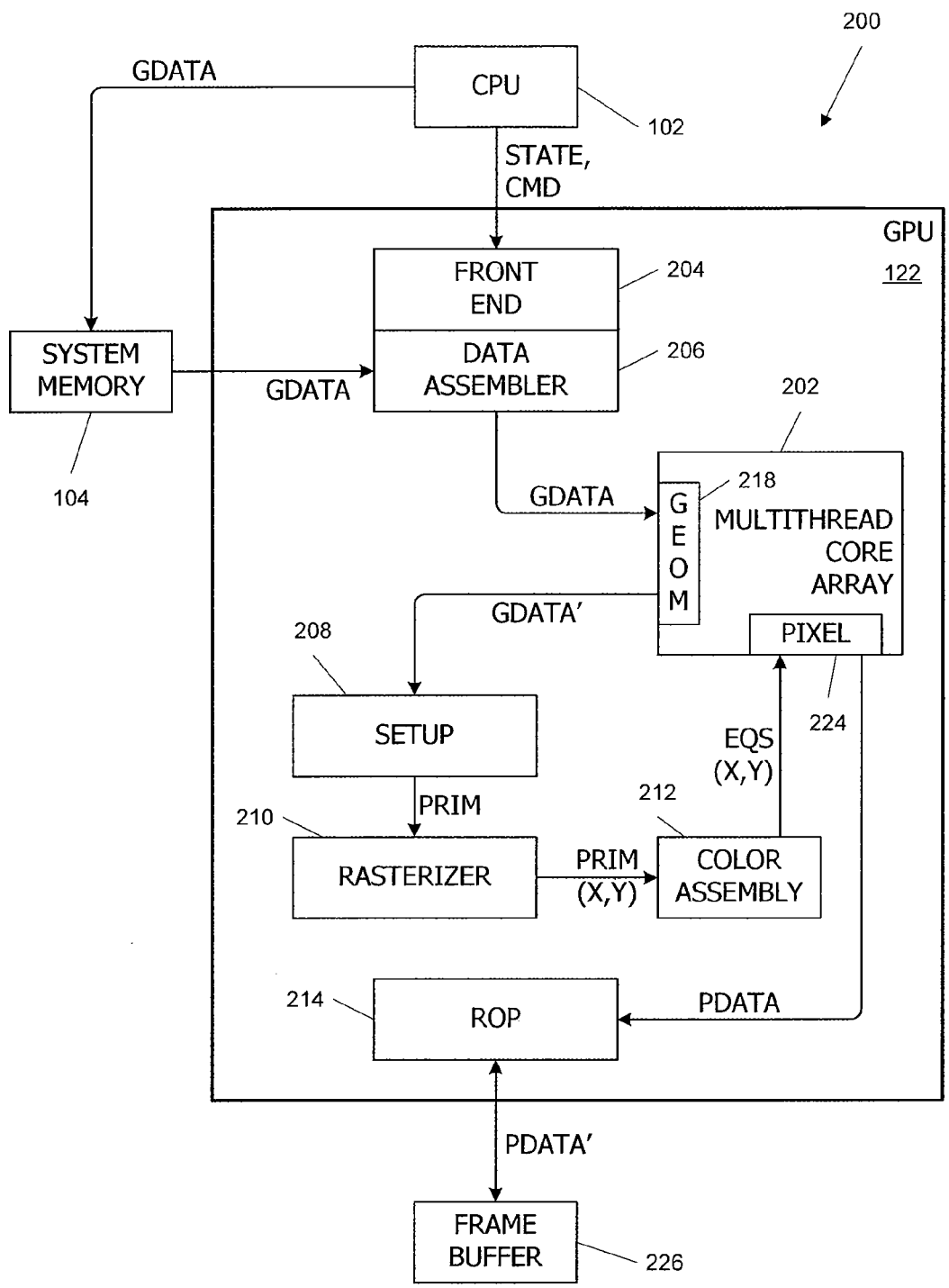
FIG. 2 is a block diagram of a rendering pipeline that can be implemented in a graphics processing unit according to an embodiment of the present invention.

FIG. 2 is a block diagram of a rendering pipeline that can be implemented in the graphics processing unit 130 of FIG. 1 according to an embodiment of the present invention. This pipeline may be integrated with another device, for example, it may be integrated with the system platform processor 110 to form a device referred to as an integrated graphics processor. In this embodiment, rendering pipeline 200 is implemented using an architecture in which any applicable vertex shader programs, geometry shader programs, and fragment shader programs are executed using the same parallel processing hardware, referred to as a multithreaded core array 202. In addition to multithreaded core array 202, rendering pipeline 200 includes a front end 204 and data assembler 206, a setup module 208, a rasterizer 210, a color assembly module 212, and a raster operations module (ROP) 214.

Front end 204 receives state information (STATE), rendering commands (CMD), and geometry data (GDATA) from CPU 100 in FIG. 1. In some embodiments of the present invention, rather than providing geometry data directly, CPU 100 provides references to locations in system memory 120 at which geometry data is stored; data assembler 206 retrieves the data from system memory 120. The state information, rendering commands, and geometry data may be used to define the desired rendered image or images, including geometry, lighting, shading, texture, motion, and/or camera parameters for a scene.

In one embodiment, the geometry data includes a number of object definitions for objects that may be present in the scene. Objects are modeled as groups of primitives that are defined by reference to their vertices. For each vertex, a position is specified in an object coordinate system, representing the position of the vertex relative to the object being modeled.

The state information and rendering commands define processing parameters and actions for various stages of rendering pipeline 200. Front end 204 directs the state information and rendering commands via a control path (not shown) to other components of rendering pipeline 200. Front end 204 directs the geometry data to data assembler 206. Data assembler 206 formats the geometry data and prepares it for delivery to a geometry module 218 in multithreaded core array 202.

Geometry module 218 directs programmable processing engines (not shown) in multithreaded core array 202 to execute vertex and geometry shader programs on the vertex data, with the programs being selected in response to the state information provided by front end 204. The vertex and geometry shader programs can be specified by the rendering application, and different shader programs can be applied to different vertices and primitives. The shader programs to be used can be stored in system memory or graphics memory and identified to multithreaded core array 202 via suitable rendering commands and state information. In some embodiments of the present invention, vertex shader and geometry shader programs can be executed in multiple passes, with different processing operations being performed during each pass. Each vertex and geometry shader program determines the number of passes and the operations to be performed during each pass. Vertex and geometry shader programs can implement algorithms using a wide range of mathematical and logical operations on vertices and other data, and the programs can include conditional or branching execution paths and direct and indirect memory accesses.

Vertex shader programs and geometry shader programs can be used to implement a variety of visual effects, including not only cylindrical wrapping, but lighting and shading effects as well. More complex vertex shader programs can be used to implement a variety of visual effects, including lighting and shading, procedural geometry, and animation operations.

Geometry shader programs differ from vertex shader programs in that geometry shader programs operate on primitives (groups of vertices) rather than individual vertices. Accordingly, geometry shader programs are particularly well-suited to implement cylindrical wrapping.

After the vertex or geometry shader programs have executed, geometry module 218 passes the processed geometry data (GDATA) to setup module 208. Setup module 208 generates edge equations from the clip space or screen space coordinates of each primitive; the edge equations are advantageously usable to determine whether a point in screen space is inside or outside the primitive.

Setup module 208 provides each primitive (PRIM) to rasterizer 210. Rasterizer 210 determines which (if any) pixels are covered by the primitive. After determining which pixels are covered by a primitive, rasterizer 210 provides the primitive (PRIM), along with a list of screen coordinates (X, Y) of the pixels covered by the primitive, to a color assembly module 212. Color assembly module 212 associates the primitives and coverage information received from rasterizer 210 with attributes (e.g., color components, texture coordinates, and surface normals) of the vertices of the primitive and generates plane equations or other suitable equations defining some or all of the attributes as a function of position in screen coordinate space.

Color assembly module 212 provides the attribute equations EQS, which may include plane equation coefficients A, B and C for each primitive that covers at least one pixel and a list of screen coordinates (X,Y) of the covered pixels to a pixel module 224 in multithreaded core array 202. Pixel module 224 directs programmable processing engines (not explicitly shown) in multithreaded core array 202 to execute one or more fragment shader programs on each pixel covered by the primitive, with the programs being selected in response to the state information provided by front end 204. As with vertex shader programs and geometry shader programs, rendering applications can specify the fragment shader program to be used for any given set of pixels. Fragment shader programs can be used to implement a variety of visual effects, including lighting and shading effects, reflections, texture blending, procedural texture generation, and so on.

Fragment shader programs are advantageously executed in multithreaded core array 202 using the same programmable processing engines that also execute the vertex and/or geometry shader programs. Thus, at certain times, a given processing engine may operate as a vertex shader, receiving and executing vertex program instructions; at other times the same processing engine may operates as a geometry shader, receiving and executing geometry program instructions; and at still other times the same processing engine may operate as a fragment shader, receiving and executing fragment shader program instructions.

Once processing for a pixel or group of pixels is complete, pixel module 224 provides the processed pixels (PDATA) to ROP 214. ROP 214 integrates the pixel values received from pixel module 224 with pixels of the image under construction in frame buffer 226, which may be located in graphics memory 140. Depth buffers, alpha buffers, and stencil buffers can also be used to determine the contribution (if any) of each incoming pixel to the rendered image. Pixel data PDATA' corresponding to the appropriate combination of each incoming pixel value and any previously stored pixel value is written back to frame buffer 226. Once the image is complete, frame buffer 226 can be scanned out to a display device and/or subjected to further processing.

It will be appreciated that the rendering pipeline described herein is illustrative and that variations and modifications are possible. The pipeline may include different units from those shown and the sequence of processing events may be varied from that described herein.

Figure 3:
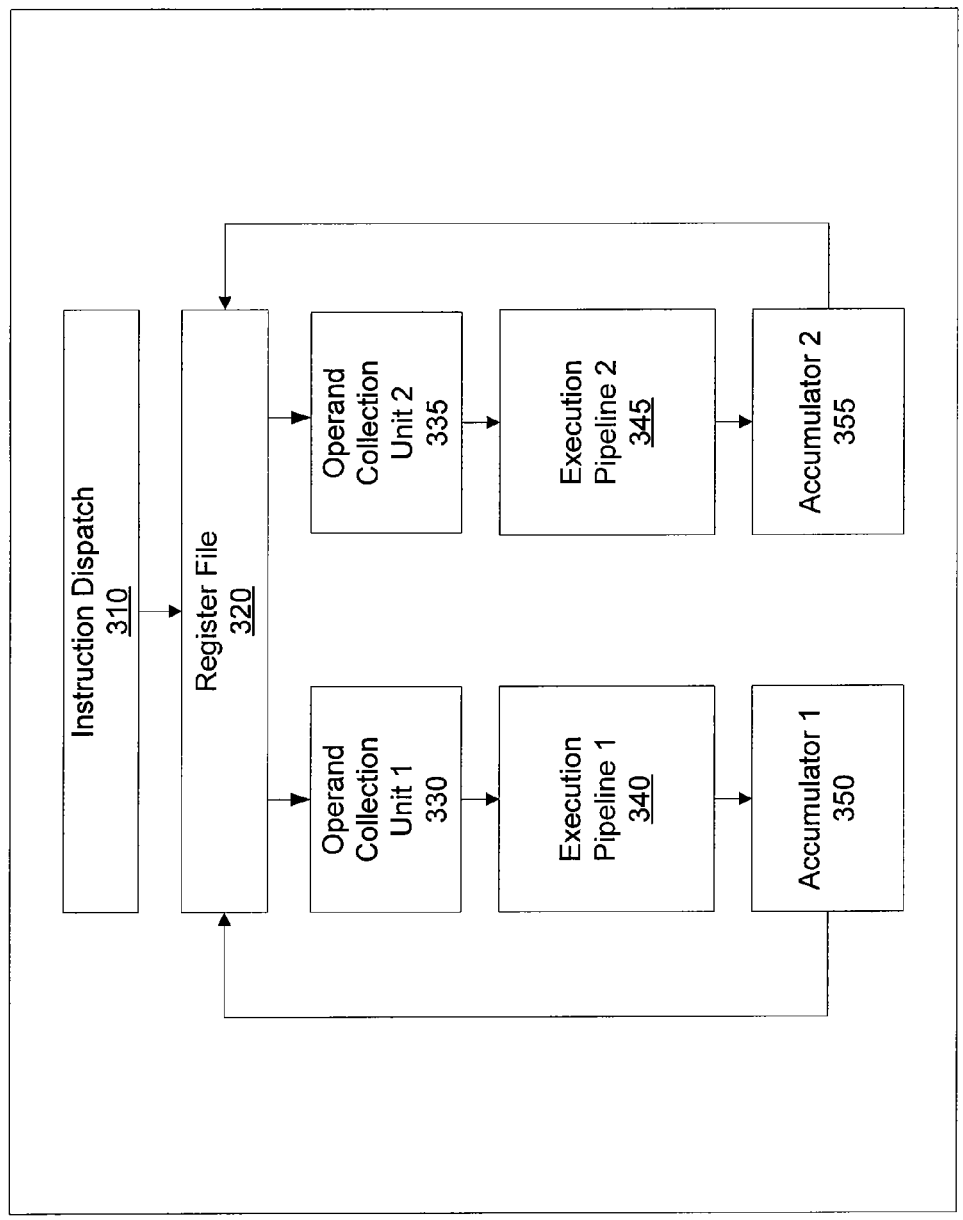
FIG. 3 is a block diagram of a single-instruction, multiple-data unit according to an embodiment of the present invention.

FIG. 3 is a block diagram of a single-instruction, multiple-data unit that may be used in the multithreaded core array 202 according to an embodiment of the present invention. This figure includes an instruction dispatch circuit 310, register file 320, operand collection units 330 and 335, execution pipelines 340 and 345, and accumulators 350 and 355.

In this particular example, each single-instruction, multiple-data unit includes two execution pipelines 340 and 345. One execution pipeline typically provides a multiply and add (MAD) function, while the other is a special function unit (SFU) that handles special function instructions, such as reciprocal, exponential, and logarithms. In other embodiments of the present invention, only one pipeline may be included, other pipelines may be included, or more than two pipelines may be included.

The instruction dispatch circuit 310 receives instructions from a CPU, other processor, or other source, and directs them to one of the execution pipelines 340 or 345. In this specific example, instructions of a multiply and add type are provided to one pipeline, while special function instructions are provided to the other. Also, certain instructions may be executed by either pipeline. These may be directed to either pipeline, for example, they may be directed to the pipeline that is the least busy of the pipelines.

The instruction dispatch unit 310 also transmits information that corresponds to a group of threads, a supergroup, that is associated with the instruction. A thread refers to an instance of a particular program or process executing on a particular set of data. For example, a thread can be an instance of a vertex shader program or processes executing on the attributes of a single vertex, or a shader program or process executing on a given primitive and fragment.

The register file 320 stores process results. These results are collected by operand collection units 330 and 335. Operand collection units 330 and 335 collect a set of operands that are needed to execute the issued instructions. A set of operand may include one or more operands. Typically, a set of operands associated with a MAD instruction includes two or three operands, while a set of operands associated with an SFU instruction includes one operand.

The operands and instructions are provided to the execution pipelines 340 and 345. In a specific embodiment of the present invention, each pipeline includes eight data paths. Each data path and accumulator is clocked at a clock rate that is twice the rate at which instructions and operands are clocked. This double clocking provides an execution pipeline having an effective width of 16 paths. Accordingly, 16 threads can be executed during each clock cycle in a pipelined manner. A specific embodiment of the present invention combines two such groups of 16 threads into a supergroup that includes 32 threads.

The accumulators 350 and 355 receive outputs from the execution pipelines 340 and 345 and store results in the register file 320. These results can be later used as operands associated with later instructions.

Figure 4:
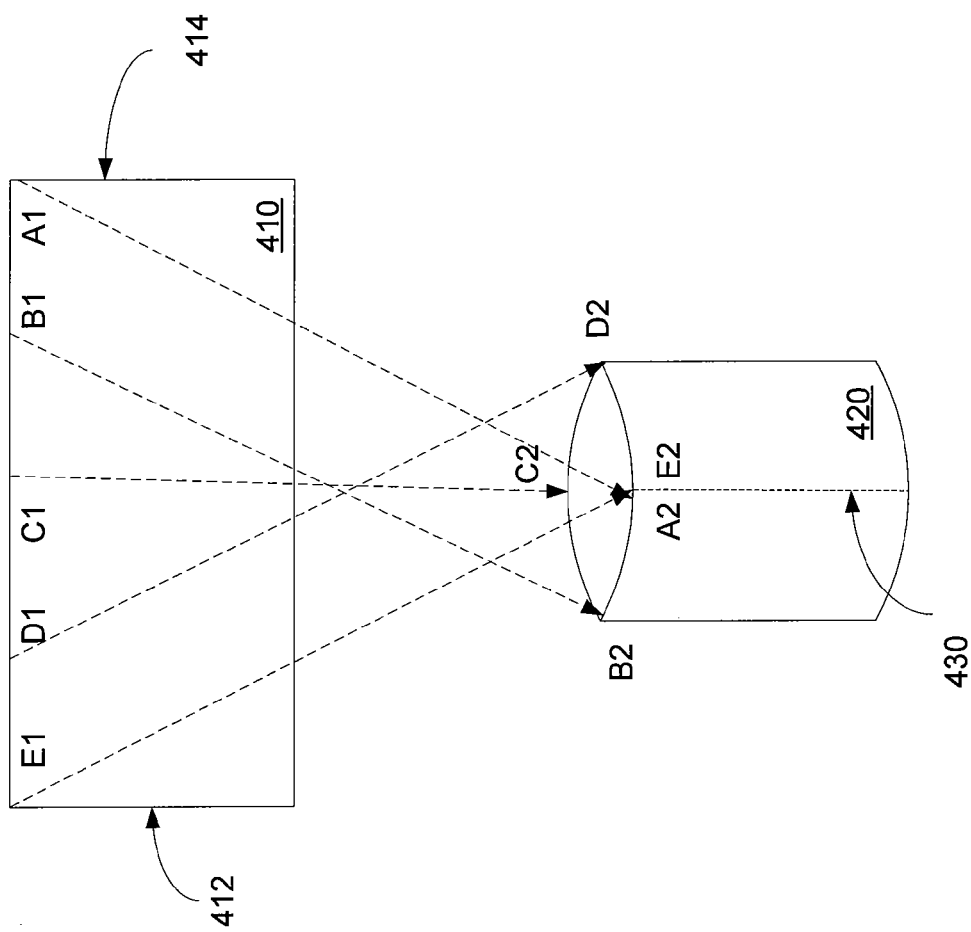
FIG. 4 illustrates an example of cylindrical wrapping that is improved by the incorporation of embodiments of the present invention.

FIG. 4 illustrates an example of cylindrical wrapping that is improved by the incorporation of embodiments of the present invention. In this example, a texture 410 is wrapped around an object 420. The texture may be any desired pattern or color. Simple examples of textures include bricks, grass, and asphalt. The texture 410 is a two-dimensional texture, though the texture may be a three-dimensional texture. Also in this example, the object 420 is a cylinder, though object 420 may be any shape, such as a cone, sphere, or block. The object 420 may be any object, visible or not, that is processed as part of a graphics image. The object 420 may be a complete object, or it may be part of an object, for example, it may be the leg of a chair.

In this example, the texture 410 has a right-hand edge 414. A vertex A1 on the texture 410 is mapped to vertex A2 on the object 420. From there, the texture 410 wraps around the cylinder 420. Specifically, vertex B1 on the texture 410 maps to vertex B2 on the object 420. Also, vertex C1 on the texture 410 maps to vertex C2 on the object 420. Similarly, vertex D1 on the texture 410 maps to vertex D2 on the cylinder 420. Finally, vertex E1 on the texture 410 maps to vertex E2 on the cylinder 420. Accordingly, the left hand edge 412 of the texture 410 aligns with the right hand edge 414 of the texture 410, forming a seam 430.

Again, for rendering purposes, the object 420 is broken up into a number of primitives, such as points, triangles, fans, and quads. If an object primitive is crossed by the seam 430, the texture 410 may not be mapped to the primitive correctly. An example illustrating a primitive crossed by a seam is shown in the following figure, while the reason the texture may not be mapped to the crossed primitive is shown in the subsequent figure.

Figure 5:
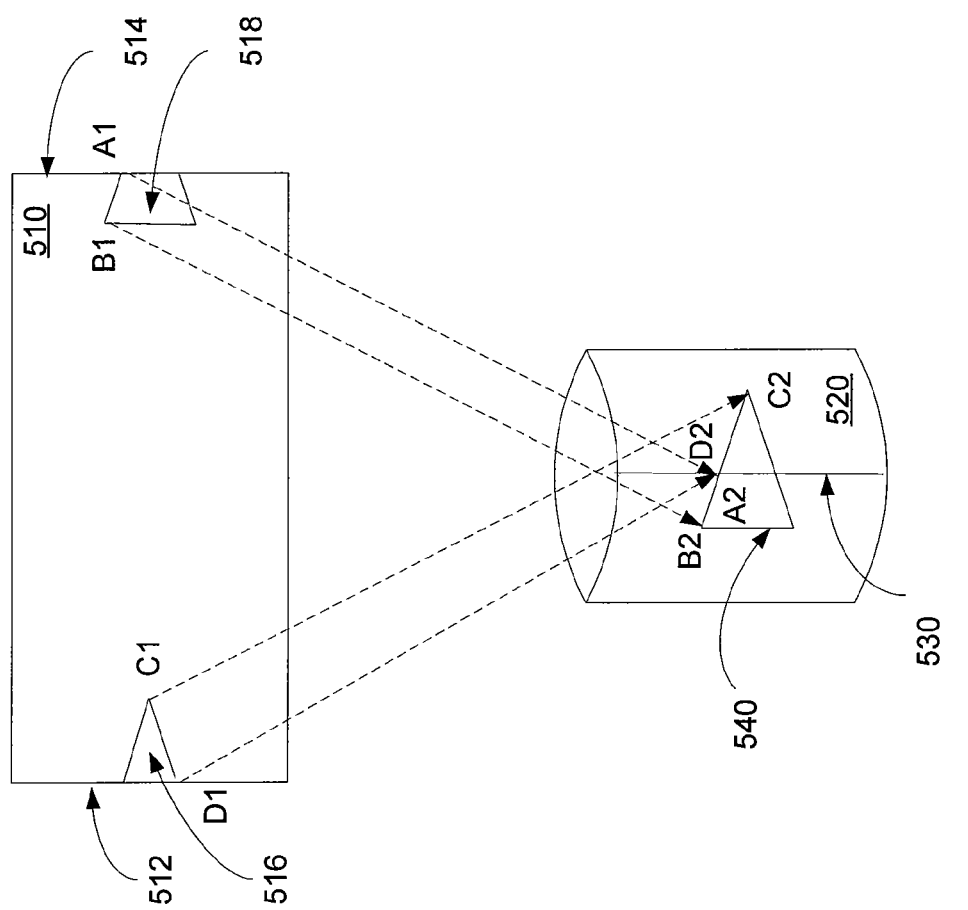
FIG. 5 illustrates an exemplary object primitive that is crossed by a seam formed during cylindrical wrapping.

FIG. 5 illustrates an exemplary object primitive that is crossed by a seam formed during cylindrical wrapping. In particular, a texture 510 is wrapped around an object 520. The object 520 is comprised of a number of primitives, such as triangle 540. In this example, triangle 540 is crossed by seam 530.

Triangle 540 is one of many primitives that form the object 520. When the texture 510 is wrapped around the object 520, a seam 530 is formed where the left-hand side 512 of the texture 510 meets the right-hand side 514 of the texture 510. This seam divides the triangle 540. Specifically, triangle 540 is divided into a first portion that extends from vertex A2 to vertex B2, and a second portion that extends from vertex D2 to vertex C2.

As can be seen, these triangular texture regions map into triangle portions 516 and 518 in texture 510. Specifically, the triangle portions map into a first texture portion in texture 510 that extends from vertex D1 to vertex C1 and a second triangular texture region that extends from vertex B1 to vertex A1.

The resulting triangular texture regions are at opposing ends of the texture 510. As can be seen in the next figure, this can possibly lead to confusion as to which portion of the texture 510 should be used to shade the triangle 540 in object 520.

Figure 6:
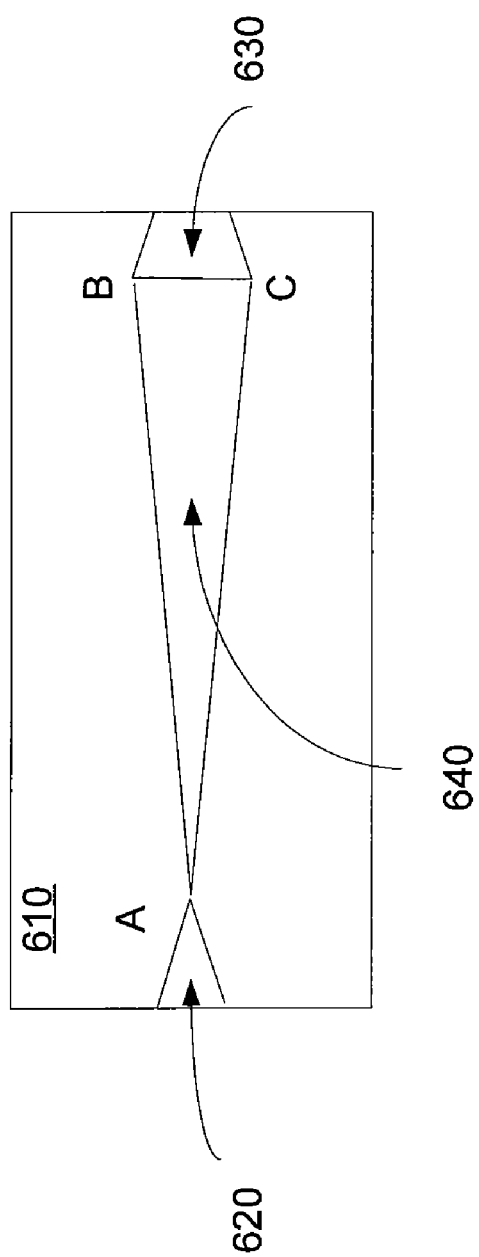
FIG. 6 illustrates two texture regions that may be mapped to a primitive defined by a single set of vertices.

FIG. 6 illustrates two texture regions that may be mapped to a primitive defined by a single set of vertices. In this a specific example, two triangular regions in the texture 610 are defined by a triangular primitive. Specifically, vertices A, B, and C may correctly identify a triangular texture region formed by texture portions 620 and 630. However, these three vertices also define a triangular region 640 in texture 610. If texture region 640 is selected, an incorrect texture pattern will be used to shade the corresponding primitive, resulting in an incorrect image being displayed.

Accordingly, embodiments of the present invention provide circuits, methods, and apparatus that ensure that the correct texture region is used. Examples of how this can be done are shown in the following figures.

Figure 7A:
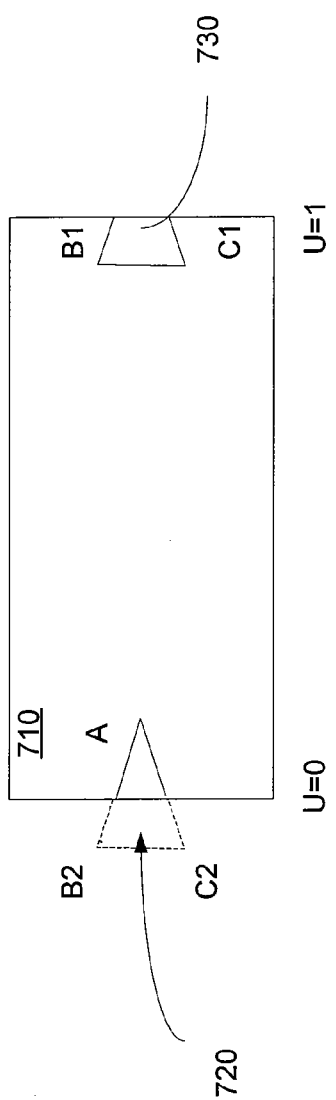
FIGS. 7A and 7B illustrate a method of shifting a texture vertex such that a plurality of vertices for a primitive maps to only a single region in the texture.

FIG. 7A illustrates a method of shifting a texture vertex such that a plurality of vertices for a primitive maps to only a single region in a texture. Specifically, triangle portion 730 is shifted to the left by the length of the texture to form triangular portion 720. In this specific example, the length of the texture 710 in the s coordinate direction has been normalized to a value of one. Accordingly, the triangle portion 730 in texture 710 is shifted to the left by one. If the length of texture 710 has not been normalized, the triangle portion 730 is shifted to the left by the length of the texture in that coordinate direction. Texture portion 730 may be shifted to the left by one by subtracting either a value of one (normalized) or the length of the texture in the s direction (not normalized) from the s coordinate of each of the vertices B-1 and C1. In either case, vertices B1 and C1 are shifted such that they become vertices B2 and C2. When this is done, vertices A, B2, and C2 define only one triangle region in texture 710.

Figure 7B:
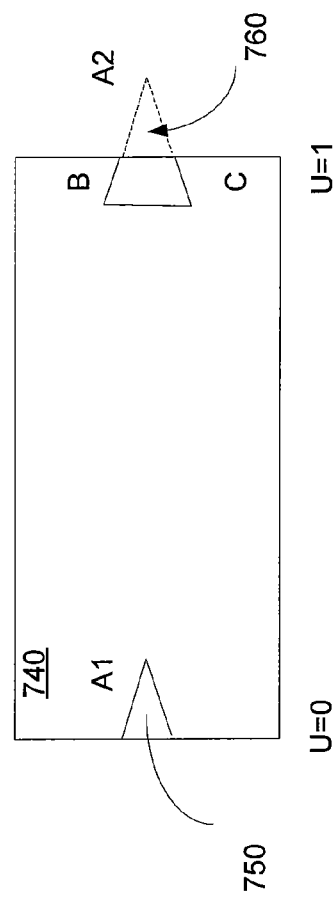

FIG. 7B illustrates another method of shifting a texture portion such that a plurality of vertices for a primitive maps to only a single region in a texture. Specifically, triangular portion 750 is shifted to the right by the length of the texture 740 in the s coordinate direction to form triangular portion 760. Again, in this specific example, the length of the texture in the s coordinate has been normalized to a value of one. Accordingly, the texture portion 750 in texture 740 is shifted to the right by one. If the length of texture 740 has not been normalized, the triangle portion 750 is shifted to the right by the length of the texture in that coordinate direction. Texture portion 750 it may be shifted to the right by one by adding either a value of one or the length of the texture in the s direction to the s coordinate of the vertex A1. In either case, vertex A1 is shifted such that it becomes vertex A2. After this, vertices A2, B, and C define only one triangle region in texture 740.

It should be noted that in these examples, vertices are shifted in only one direction, specifically the s coordinate direction. According to embodiments of the present invention, vertices may be shifted in any coordinate direction, for example, vertices may be shifted in the s, t, r, or q coordinate direction, or they may be shifted in any combination of these directions.

In various embodiment of the present invention, different methods can be used to determine whether a vertex should be shifted in this manner. For example, a distance between to vertices, for example, A1 and B, can be determined. Typically, this distance is measured along the various coordinate axes. For example, differences in position between two vertices in each of the s., t., r, and q directions may be found. Alternately, the distance between two vertices may be measured in absolute terms, that is, along a straight line from a first vertex to a second vertex.

These differences can then be compared to a threshold value. If a difference in one pair of coordinates is above the threshold value, it is assumed that the vertices are sufficiently far apart that one of the vertices should be shifted to bring them closer together.

For example, two vertices may be compared. A difference between each coordinate s, t, r, and q for the two vertices is determined. If a difference between two such corresponding coordinates is greater than a threshold value, the coordinate for one of the vertices is modified. In various embodiment of the present invention, differences in coordinate values for s, t, r, and q may be compared to either the same or different threshold values. In a specific embodiment of the present invention, the threshold value for each coordinate is one half of the length of the texture along that coordinate axis.

In the specific example of FIG. 7B, a difference between the s coordinates of the vertices A1 and B can be determined. Since this difference is more than one half of the length of the texture in the s coordinate direction, vertex A1 is shifted in the s direction by the length of the texture.

Again, cylindrical wrapping is a legacy concept at this time. That is, cylindrical wrapping needs to be supported to ensure compliance with older software and games, though it is not used by newer graphics standards. For this reason, in some embodiments of the present invention, this feature is optional. Accordingly, various embodiments of the present invention allow cylindrical wrapping to be enabled or disabled. In these embodiments of the present invention, this feature may be enabled or disabled for each primitive, that is, on a primitive-by-primitive basis. Alternately, cylindrical wrapping may be enabled or disabled on a global basis, that is, for all primitives. Cylindrical wrapping may be enabled or disabled by driver software commands, data stored in one or more registers, or by other means.

It is also desirable that the same results are achieved independently of the order that vertices are received. Accordingly, various embodiments of the present invention sort vertices prior to comparing their coordinate values. This sorting may be based on position or other criteria. In other embodiments of the present invention, other methods of achieving vertex order invariance may be used. An example of a method that includes sorting vertices, determining distances between vertices, and modifying vertices coordinates is shown in the following figure.

Figure 8:
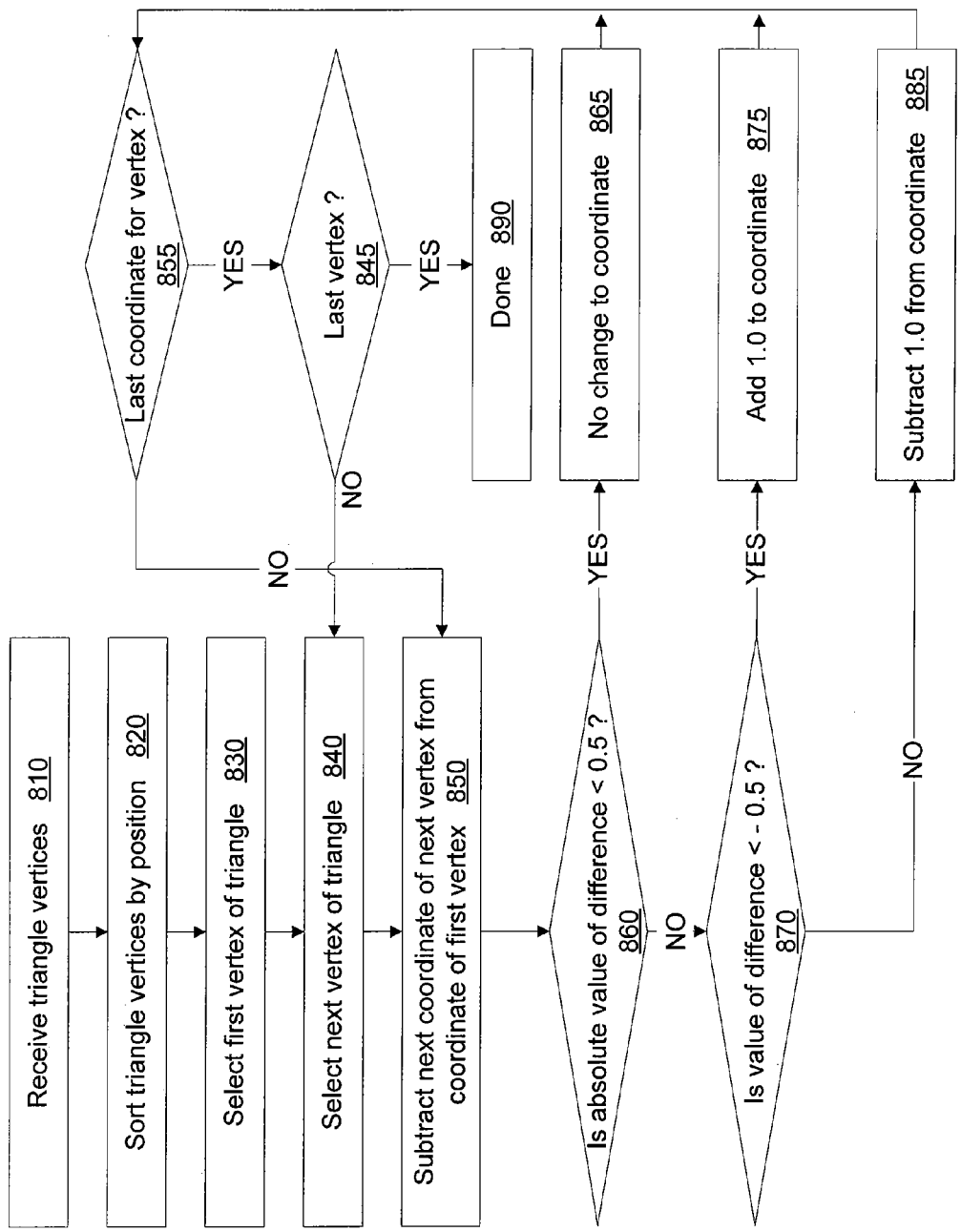
FIG. 8 illustrates a method of modifying coordinate values to ensure proper cylindrical wrapping according to an embodiment of the present, invention.

FIG. 8 illustrates a method of modifying coordinate values to ensure proper cylindrical wrapping according to an embodiment of the present invention. In this example, vertices are sorted by position. Following this, one vertex is selected as a reference vertex. It is then determined whether the other vertices are farther than a threshold value from the reference vertex. If one or more are, those vertices are shifted such that they are closer to the reference vertex. In this way, the vertices identify only a single region, instead of multiple regions, in a texture.

Specifically, in act 810, vertices for a primitive, in this a specific example a triangle, are received. In act 820, the triangle vertices are sorted by position. A first vertex is selected in act 830. In act 840, a next, in this case a second, vertex is selected.

In act 850, a coordinate of the second vertex is subtracted from the corresponding coordinate of the first vertex. In act 860, it is determined whether the absolute value of this difference is greater than a threshold value, in this example, one-half. Specifically, if the texture length has been normalized, the absolute value is compared to one-half. If the texture length has not been normalized, the absolute value is compared to one-half a texture length along that coordinate axis.

If the difference is less than this threshold value, then those coordinate values are sufficiently close that no change in coordinate value is needed, as shown in act 865. If the difference is more than this value however, this coordinate for the second vertex needs to be adjusted to ensure that the vertices define only one region of the texture.

Accordingly, in act 870, it is determined whether the value of the difference is less than negative one-half (or one-half the texture length in that coordinate dimension). If it is, then a value of one is added to the coordinate in 875. Again, one is added to the coordinate if the coordinate values are normalized, otherwise the length of the texture along that coordinate axis is added to that coordinate of the second vertex. If the value of the difference is not less than negative one-half (or one-half the texture length in that coordinate dimension), then a value of one, or the length of the texture in that coordinate direction, is subtracted from that coordinate of the second vertex.

Once the coordinate value is either not changed in act 865, or modified in act 875 or act 885, it is determined whether the last coordinate for the second vertex has been subtracted from the last coordinate the first vertex. If not, the next coordinate is selected and the process repeats. If the last coordinate has been reached in act 855, then in act 845, it is determined whether the last vertex has been reached. If it hasn't, the next vertex is selected in act 840, and the process repeats. If the last vertex has been reached in act 845, this process for this primitive is complete in act 890.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method of processing graphics information comprising:
    receiving information regarding a plurality of primitives defining an object;
    receiving information regarding a texture;
    receiving an instruction to cylindrically wrap the object with the texture;
    executing the instruction to cylindrically wrap the object with the texture using a geometry shader program running on shader hardware; and
    storing the results in a memory,
    wherein executing the instruction to cylindrically wrap the object with the texture using a geometry shader program running on shader hardware comprises:
    selecting a first vertex from a plurality of vertices for a primitive in the plurality of primitives as a reference; and
    for a second vertex of the primitive, for each coordinate of the second vertex:
        determining whether a coordinate of the second vertex is more than a threshold distance away from a corresponding coordinate of the first vertex; and if it is, then modifying the coordinate of the second vertex; else
        not modifying the coordinate of the second vertex, and
    wherein modifying the coordinate comprises:
    if a value of the coordinate of the second vertex is less than a value of the corresponding coordinate of the first vertex; then
    adding a length of the texture in the direction of the coordinate; else
    subtracting a length of the texture in the direction of the coordinate.

2. The method of claim 1 wherein receiving information regarding a plurality of primitives defining an object includes receiving the plurality of vertices for the primitive in the plurality of primitives.

3. The method of claim 2 wherein determining whether a coordinate of the second vertex is more than a threshold distance away from a corresponding coordinate of the first vertex comprises:
    determining a difference between the coordinate of the second vertex and the corresponding coordinate of the first vertex; and
    determining whether an absolute value of the first difference is greater than or less than a threshold portion of a length of the texture in a direction of the coordinate.

4. The method of claim 3 wherein the threshold portion is one-half.

5. The method of claim 2 wherein the coordinates for the first and second vertices comprise s, t, r, and q coordinates.

6. The method of claim 1 wherein the shader hardware is a unified shader capable of executing vertex shader, geometry shader, and fragment shader instructions.

7. The method of claim 1 wherein executing the instruction to cylindrically wrap the object with the texture using a geometry shader program running on shader hardware comprises:
executing the instruction to cylindrically wrap an object with a texture using geometry shader program running on shader hardware that includes a plurality of single-instruction, multiple-data processors.

8. The method of claim 1 wherein the shader hardware is formed on a first integrated circuit and the memory is formed on a second integrated circuit.

9. The method of claim 1 wherein the memory is a register file.

10. An integrated circuit comprising:
a front end to receive a plurality of primitives defining an object, information regarding a texture, and an instruction to cylindrically wrap the object using the texture;
shader hardware to run a geometry shader program to execute the instruction to cylindrically wrap the object using the texture; and
a memory to store results generated by the shader hardware,
wherein executing the instruction to cylindrically wrap the object with the texture comprises:
selecting a first vertex from a plurality of vertices for a primitive of the object as a reference; and
for a second vertex of the primitive, for each coordinate of the second vertex:
determining whether a coordinate of the second vertex is more than a threshold distance away from a corresponding coordinate of the first vertex; and if it is, then modifying the coordinate of the second vertex; else
not modifying the coordinate of the second vertex, and
wherein modifying the coordinate comprises:
if a value of the coordinate of the second vertex is less than a value of the corresponding coordinate of the first vertex; then
adding a length of the texture in the direction of the coordinate; else
subtracting a length of the texture in the direction of the coordinate.

11. The integrated circuit of claim 10 wherein the shader hardware is a unified shader capable of executing vertex shader, geometry shader, and fragment shader instructions.

12. The integrated circuit of claim 10 wherein the shader hardware comprises a plurality of single-instruction, multiple-data processors.

13. The integrated circuit of claim 11 wherein the integrated circuit is a graphics processor further comprising:

a geometry circuit to receive the instruction to cylindrically wrap the object using the texture and to direct the shader hardware to run a geometry shader program to execute the instruction to cylindrically wrap the object using the texture, the object comprising a plurality of primitives; and
a rasterizer to receive the plurality of primitives from the shader hardware and to determine which pixels are covered by each of the plurality of primitives.

14. A method of processing graphics information comprising:
on an integrated circuit:
receiving information for a texture, the texture having a first length in a first dimension;
receiving information regarding an object including a primitive, the primitive comprising a plurality of vertices including a first vertex and a second vertex;
selecting a first vertex of the primitive as a reference;
for a second vertex of the primitive, for each coordinate of the second vertex:
determining whether a coordinate of the second vertex is more than a threshold distance away from a corresponding coordinate of the first vertex; and if it is, then modifying the coordinate of the second vertex; else
not modifying the coordinate of the second vertex
wherein modifying the coordinate comprises:
if a value of the coordinate of the second vertex is less than a value of the corresponding coordinate of the first vertex; then
adding a length of the texture in the direction of the coordinate; else
subtracting a length of the texture in the direction of the coordinate.

15. The method of claim 14 wherein determining whether a coordinate of the second vertex is more than a threshold distance away from a corresponding coordinate of the first vertex comprises:
determining a first difference between the coordinate of the second vertex and the corresponding coordinate of the first vertex; and
determining whether an absolute value of the first difference is greater than or less than a threshold portion of the first length.

16. The method of claim 14 wherein the coordinates for the first and second vertices comprise s, t, r, and q coordinates.

17. The method of claim 14 wherein the threshold value is one half of a length of the texture in the direction of the coordinate.

18. The method of claim 14 further comprising:
before selecting a first vertex of the primitive as a reference, sorting the plurality of vertices.

* * * * *

UNITED STATES PATENT AND TRADEMARK OFFICE
CERTIFICATE OF CORRECTION

PATENT NO. : 7,663,621 B1  Page 1 of 1
APPLICATION NO. : 11/556515
DATED : February 16, 2010
INVENTOR(S) : Allen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 630 days.

Signed and Sealed this

Twenty-eighth Day of December, 2010

David J. Kappos
*Director of the United States Patent and Trademark Office*